United States Patent
Nakano et al.

(10) Patent No.: US 6,808,034 B2
(45) Date of Patent: Oct. 26, 2004

(54) SNOWMOBILE EXHAUST SYSTEM

(75) Inventors: Takuji Nakano, Shizuoka (JP); Shinichi Nishijima, Shizuoka (JP)

(73) Assignee: Yamaha Hatsudoki Kabushiki Kaisha (JP)

( * ) Notice: Subject to any disclaimer, the term of this patent is extended or adjusted under 35 U.S.C. 154(b) by 0 days.

(21) Appl. No.: 10/327,582

(22) Filed: Dec. 20, 2002

(65) Prior Publication Data

US 2003/0150658 A1 Aug. 14, 2003

Related U.S. Application Data

(63) Continuation-in-part of application No. 10/014,062, filed on Dec. 10, 2001.

(30) Foreign Application Priority Data

Dec. 27, 2001 (JP) .................................. 2001-397417

(51) Int. Cl.[7] ............................................. B62M 29/00
(52) U.S. Cl. ...................... 180/190; 180/68.3; 180/309; 180/89.2; 123/65 PE; 60/313
(58) Field of Search .................. 180/182, 184–186, 180/190, 9.21, 9.1, 9, 9.25, 68.3, 309, 89.2, 193; 123/65 PE; 60/313, 314, 321

(56) References Cited

U.S. PATENT DOCUMENTS

| | | |
|---|---|---|
| 3,779,327 A | 12/1973 | Pereault |
| 4,046,219 A | 9/1977 | Shaikh |
| 4,186,819 A | 2/1980 | Nowak et al. |
| 4,418,782 A | 12/1983 | Nakazima |
| 4,917,207 A | 4/1990 | Yasui et al. |
| 5,862,662 A | 1/1999 | Fukuda et al. |
| 5,957,230 A | 9/1999 | Harano et al. |
| 6,109,217 A | 8/2000 | Hedlund et al. |
| 6,134,885 A | 10/2000 | Gilbertson |
| 6,155,374 A | 12/2000 | Uchida |
| 6,167,700 B1 | 1/2001 | Lampert |
| 6,227,323 B1 | 5/2001 | Ashida |
| 6,237,566 B1 | 5/2001 | Spaulding |
| 6,263,991 B1 | 7/2001 | Savage et al. |

*Primary Examiner*—Lesley D. Morris
*Assistant Examiner*—Matthew Luby
(74) *Attorney, Agent, or Firm*—Knobbe, Martens, Olson & Bear LLP

(57) ABSTRACT

A snowmobile has a frame construction that defines a recess above a drive unit. The recess is formed by a horizontal member and a pair of vertical members. A portion of the exhaust system extends within the recess at a location above the drive unit. An exhaust system cooling passage is provided to reduce temperature rise of the exhaust system.

21 Claims, 12 Drawing Sheets

SNOWMOBILE EXHAUST SYSTEM

RELATED APPLICATIONS

This application is based on and claims the priority of Japanese Patent Application No. 2001-397417, filed on Dec. 27, 2001, and is a continuation-in-part of U.S. application Ser. No. 10/014,062, filed Dec. 10, 2001, both of which are hereby expressly incorporated by reference in their entirety.

BACKGROUND OF THE INVENTION

1. Field of the Invention

The present invention generally relates to exhaust systems for land vehicles. More specifically, the present invention relates to an improved exhaust system layout for snowmobiles that reduces temperature increases in the associated exhaust systems.

2. Description of the Related Art

Snowmobiles are powered by internal combustion engines that are mounted to a frame assembly within a substantially enclosed engine compartment. The engine compartment typically is defined within a portion of a body panel (also mounted to the frame assembly) such that direct airflow through the engine compartment is inhibited.

An exhaust system mounts to the frame assembly and to the engine for routing exhaust byproducts from the engine to the atmosphere. Generally, the exhaust system mounts to a forward-facing portion of the engine and extends forward before wrapping around one side of the engine.

Due to the restricted air flow within the engine compartment, the amount of cooling provided by the air entering the engine compartment is greatly reduced. Thus, the temperatures of the exhaust system components tend to be very high. The increased temperatures result in increased heat transfer from the exhaust system to a variety of other components adjacent the exhaust system, e.g., to the snowmobile frame assembly. Heat transfer to the frame assembly and other nearby components can cause such components to reach very temperatures. For many reasons, such high temperatures are not desired.

SUMMARY OF THE INVENTION

Thus, a snowmobile arrangement that can provide increased cooling to an exhaust system, which will reduce the amount of heating of components adjacent the exhaust system, is desired. Additionally, the exhaust system and surrounding structures preferably are simply constructed and admit of a rather simple cooling arrangement.

Accordingly, one aspect of the present invention involves a snowmobile comprising a frame assembly, an engine, a drive belt, and exhaust system, and an exhaust system cooling passage. The frame assembly includes a forward portion and an inverted generally U-shaped portion. The engine is mounted to the forward portion of the frame assembly. The drive belt is powered by the engine and is disposed at least partially within the inverted generally U-shaped portion. The exhaust system is connected to the engine and extends rearwardly of the engine in a region defined between the inverted generally U-shaped portion and the drive belt. The exhaust cooling passage is defined between the forward portion of the frame assembly and the rear of the snowmobile. The exhaust system cooling passage is located adjacent at least a portion of the exhaust system.

Another aspect of the present invention involves a snowmobile that comprises a frame assembly, an engine, a seat, an exhaust system, and a resilient seat mount. The frame assembly comprises a forward portion and an inverted generally U-shaped portion. The engine is mounted to the forward portion of the frame assembly. The seat is coupled with the U-shaped portion of the frame assembly. The exhaust system is connected to the engine and extending rearwardly of the engine in a region defined below the seat to a silencer box positioned generally below the seat. The resilient seat mount is positioned between the silencer box and the seat. The resilient seat mount is configured to reduce heat transfer between the silencer box and the seat.

BRIEF DESCRIPTION OF THE DRAWINGS

These and other features, aspects and advantages of the present invention will be better understood with reference to a preferred embodiment, which is illustrated in the accompanying drawings. The illustrated embodiment is merely exemplary and is not intended to define the outer limits of the scope of the present invention. The drawings of the illustrated arrangement comprise twelve figures.

DETAILED DESCRIPTION OF THE PREFERRED EMBODIMENT

Figure 1:
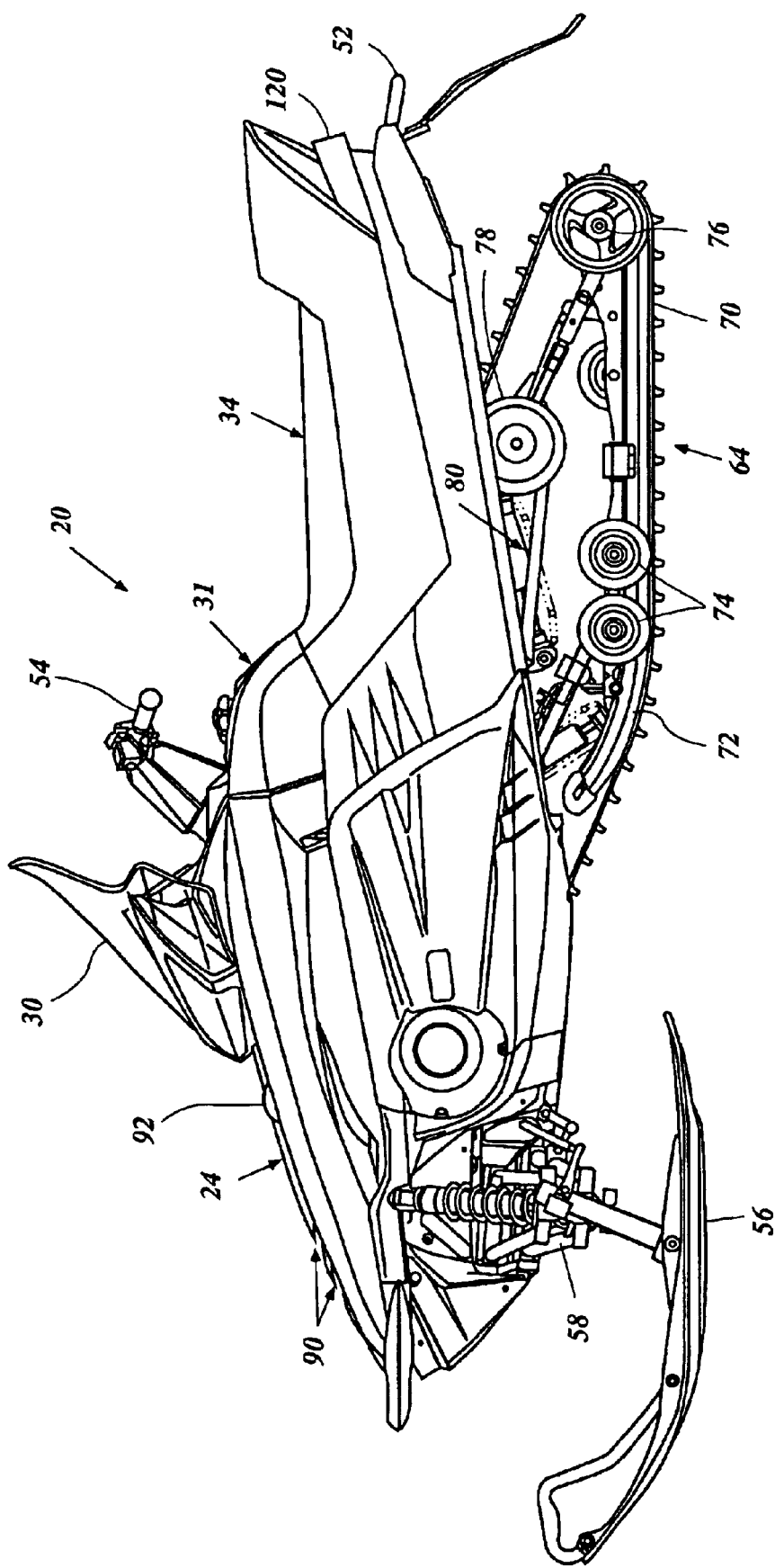
FIG. 1 is a side elevation view of a snowmobile arranged and configured in accordance with certain features, aspects and advantages of the present invention.
Figure 2:
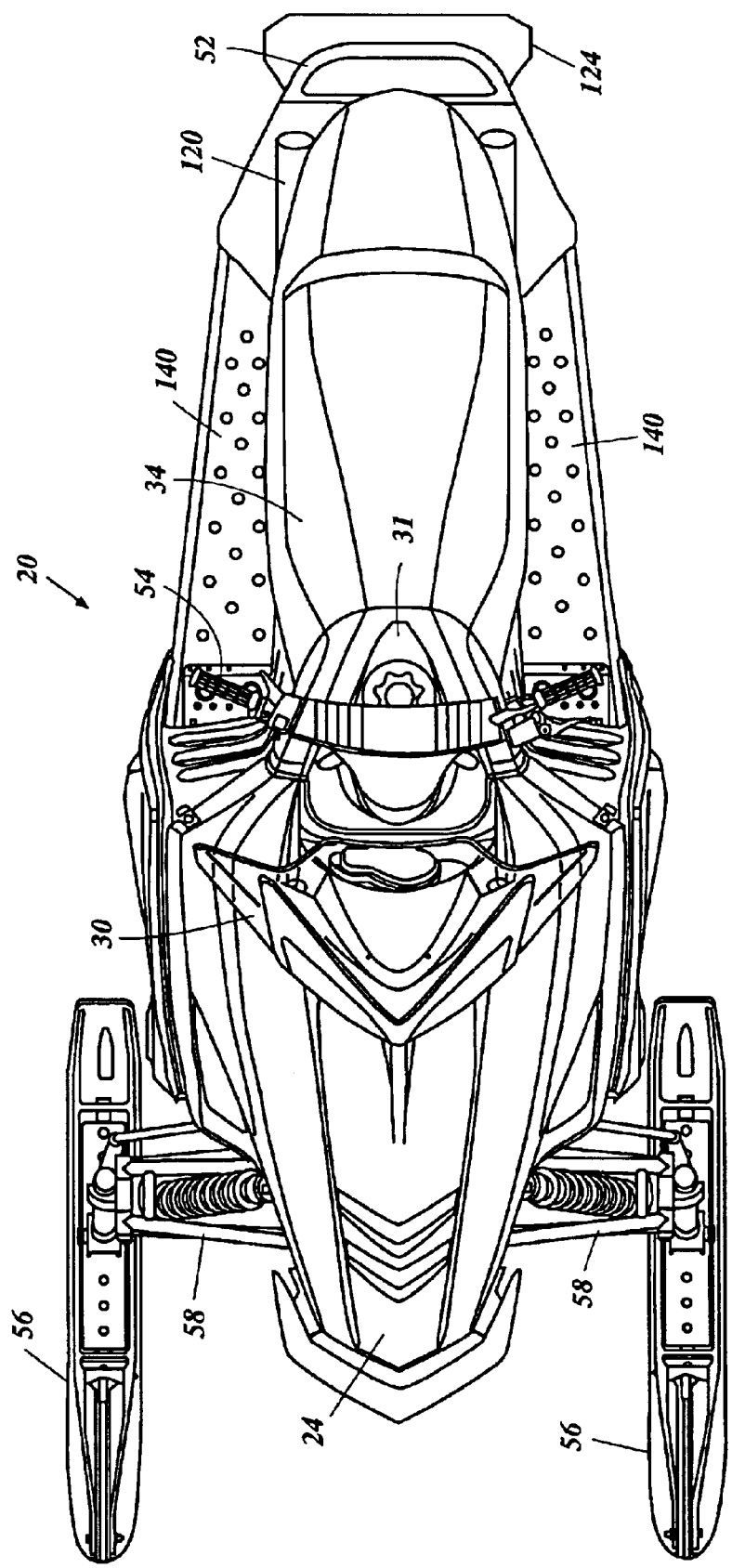
FIG. 2 is a top plan view of the snowmobile of FIG. 1.
Figure 3:
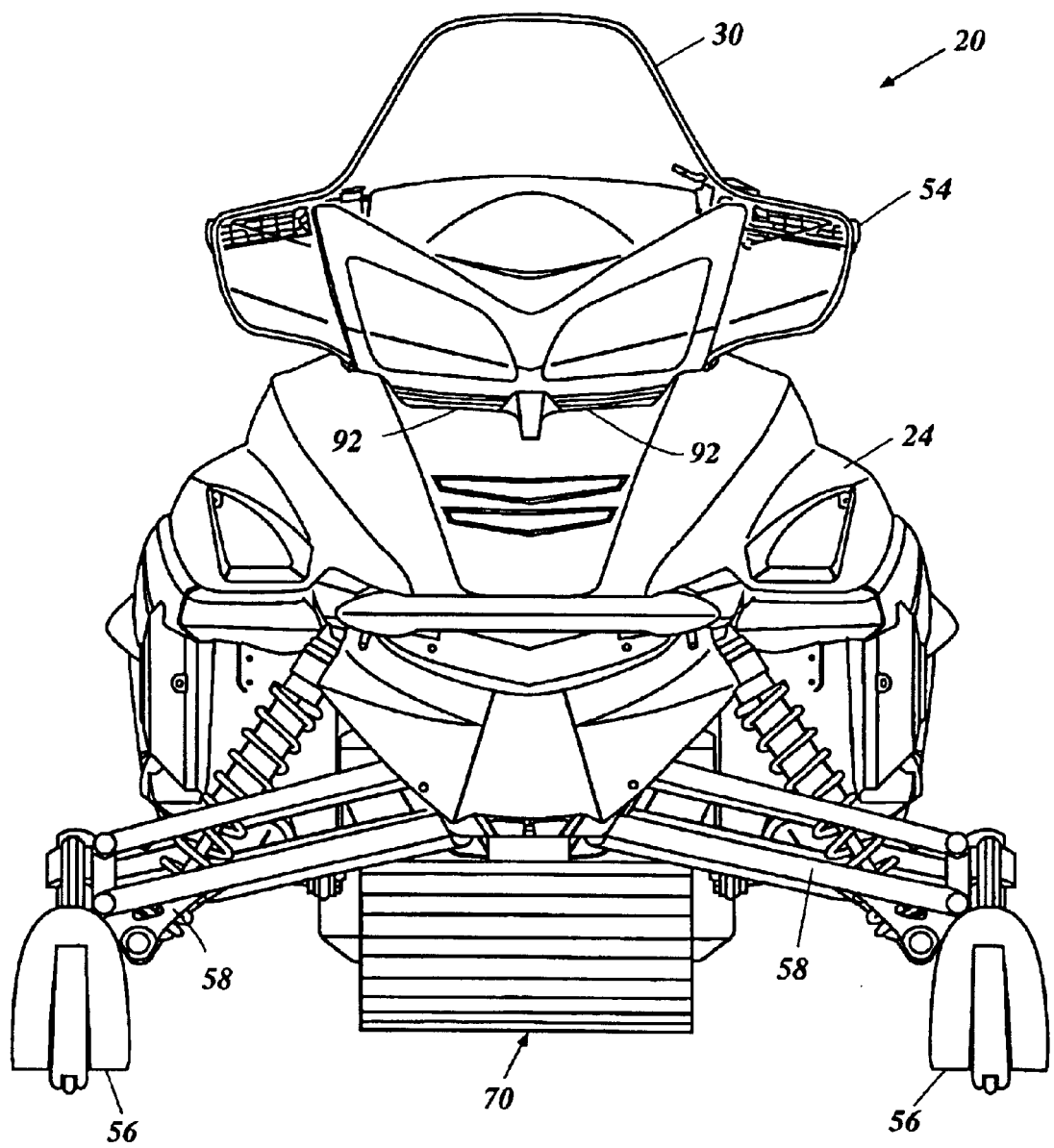
FIG. 3 is a front elevation view of the snowmobile of FIG. 1.

With reference now to FIGS. 1–3, a snowmobile featuring certain features, aspects and advantages of the present invention will be described. The snowmobile, indicated generally by the reference numeral 20, is an environment for which many features, aspects and advantages of the present invention have been specially adapted. Nevertheless, certain features, aspects and advantages of the present invention can be used with other vehicles.

Figure 4:
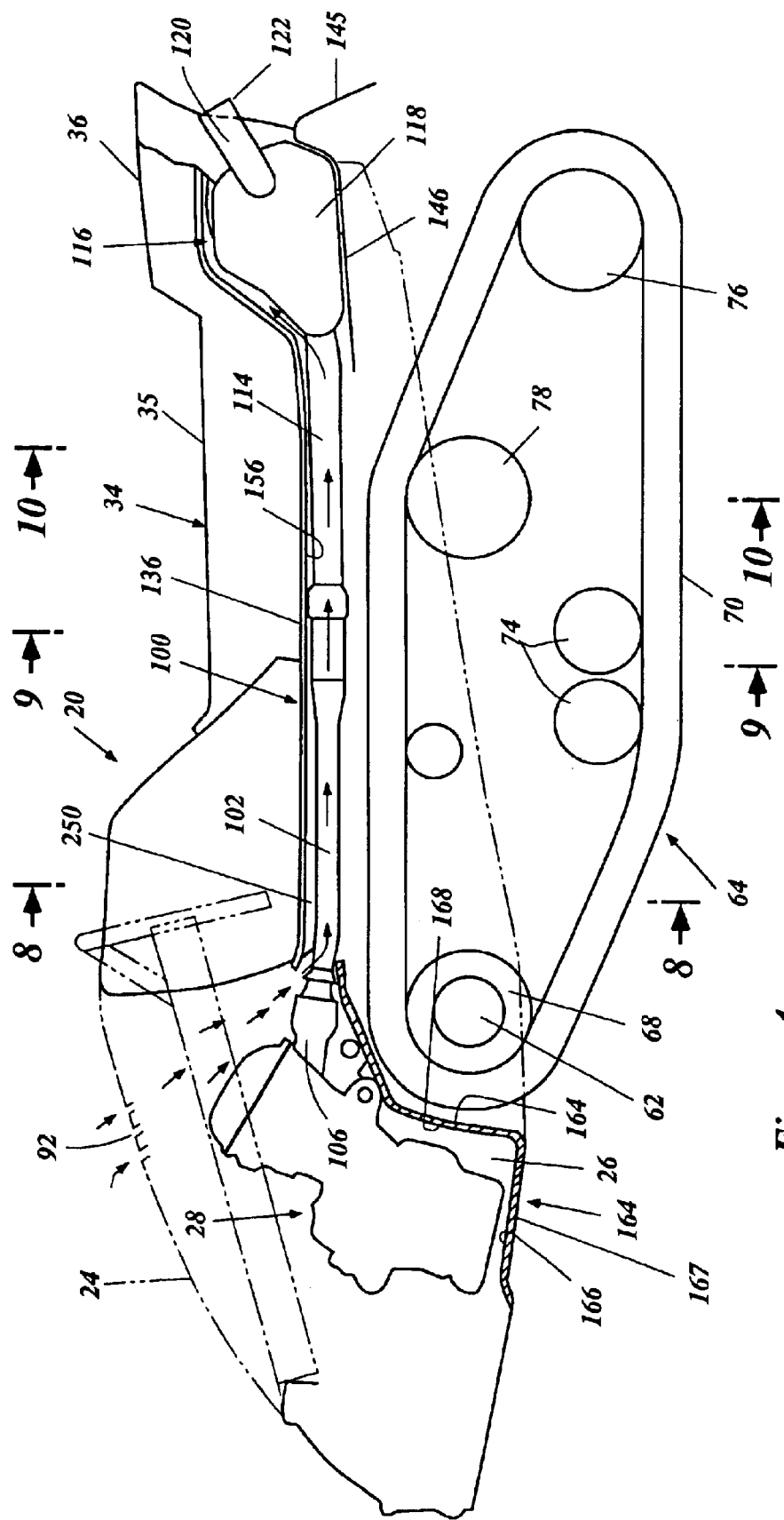
FIG. 4 is a simplified side elevation view of the snowmobile of FIG. 1 featuring certain components of an exhaust system thereof.

The snowmobile 20 generally comprises a frame assembly 22 (see FIGS. 5–6) that carries a number of other components of the snowmobile 20. The frame assembly 22 will be described in greater detail below. A forward body cover 24 is disposed over a forward portion of the frame assembly 22. As illustrated in FIG. 4, the forward body cover 24 covers, in part, an engine compartment 26 in which an engine 28 is mounted. The engine 28 will be described in greater detail below.

A windshield 30 is disposed over a mid-portion of the body cover 24. The windshield 30 provides some degree of protection for the riders from wind and other elements during operation of the snowmobile 20. Rearward of the windshield 30, a fuel tank 31 that includes a bottom wall 32 is mounted to the frame assembly 22 in a manner discussed more fully below. In one embodiment, the bottom wall 32 comprises a central fuel tank protrusion 33 that extends upward into the enclosed volume of the tank 32. See FIG. 8. In the illustrated arrangement, the fuel tank protrusion 33 cooperates with a portion of the frame assembly 22 to provide a cooling passage, as discussed more fully below. Preferably the body cover 24 and the fuel tank 31 also blend together in an aesthetically pleasing fashion.

Figure 10:
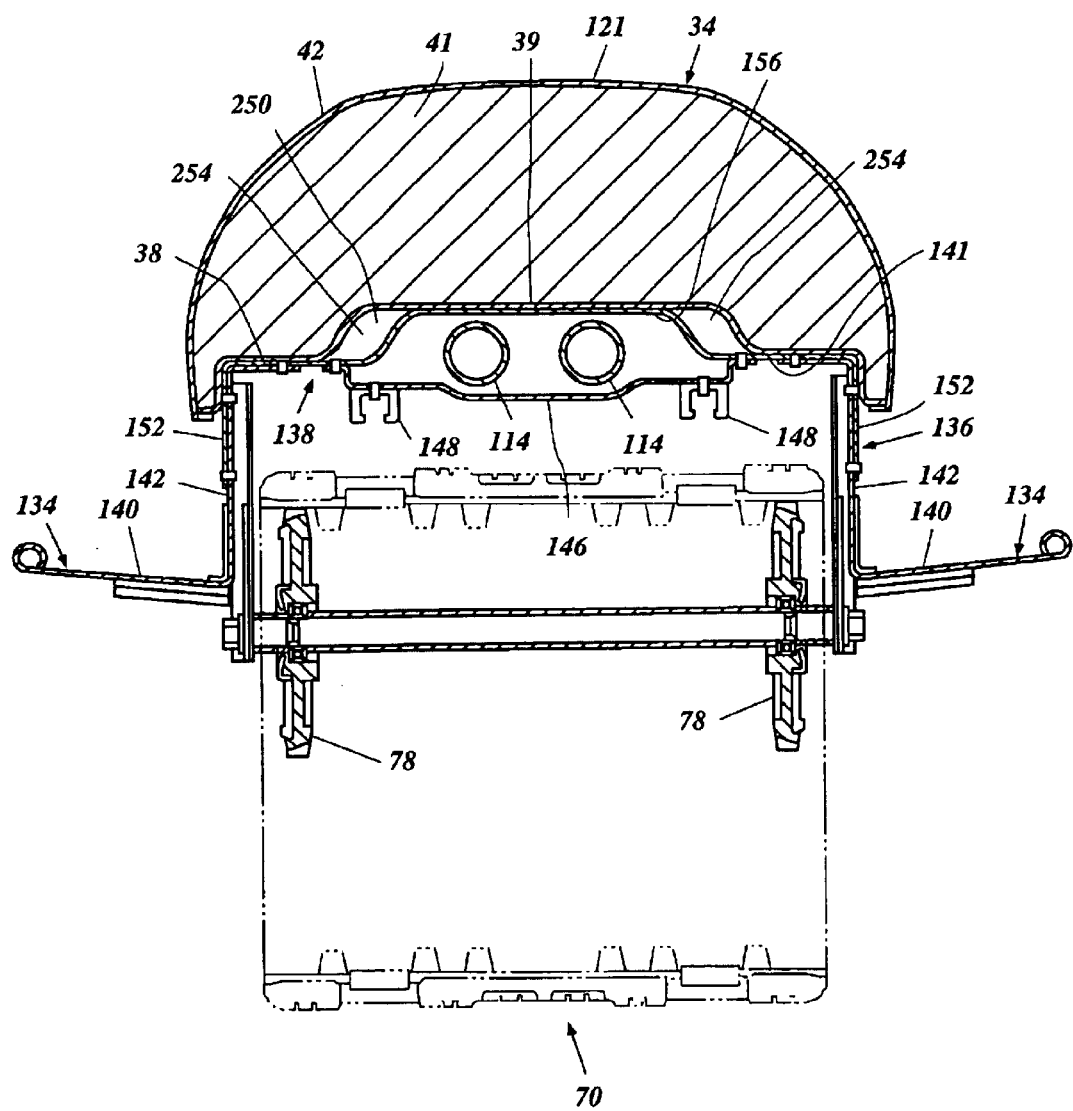
FIG. 10 is another section view of a portion of the snowmobile taken along the line 10—10 in FIG. 4.

Rearward of the fuel tank 31, a seat 34 is mounted to the frame assembly 22. With reference to FIG. 4, the seat 34 generally comprises a rider portion 35 adjacent the fuel tank 31 and an ornamental portion 36 located rearward of the rider portion 35. The seat 34 also comprises a bottom plate 37 that is sized and configured to attach to the frame assembly 22. See FIG. 11. The bottom plate 37 generally supports the seat 34. As illustrated in FIG. 10, the bottom plate 37 preferably includes a generally horizontally extending portion 38, a seat bottom plate protrusion, or seat protrusion 39, and a rearwardly inclined portion 40 (see FIG. 11). The generally horizontally extending portion 38 of the bottom plate 37 supports, at least partially, the rider portion 35 of the seat 34. The rearwardly inclined portion 40 is positioned generally below and supports the ornamental portion 36 of the seat 34 in a manner to be discussed in greater detail below in connection with FIGS. 11 and 12. The seat bottom plate protrusion 39 preferably adjoins the generally horizontally extending portion 38 and extends upwardly with respect thereto. In some embodiments, the seat bottom plate protrusion 39 cooperates with a portion of the frame assembly 22 to provide an exhaust cooling passage, as described more filly below.

A seat cushion member 41 is mounted to the bottom plate 37. The seat cushion member 41 can be formed of urethane or any suitable resilient or cushioning material. Overlying the seat cushion member 41 is a surface skin 42 in the illustrated arrangement. Preferably, the surface skin 42 is formed of a material that is substantially water impermeable. The seat 34 also preferably is designed to allow an operator to squeeze the seat 34 between the knees and is appropriately designed to absorb such forces. More details of the construction of the seat 34 and its interconnection with the frame assembly 22 are discussed below in connection with FIGS. 11 and 12.

Rearward of the seat 34 is positioned a grab bar 52 that can be used to raise a rear portion of the snowmobile for turning and maneuvering when the snowmobile is not being ridden. While the illustrated grab bar 52 is generally U-shaped and is mounted in a generally horizontal manner, other forms of grab bars can be used. For instance, the grab bar 52 can be loops, semicircular, vertical or inclined in orientation. In short, any suitable grab bar construction can be used.

Forward of the seat 34 and the fuel tank 31 is a steering handle assembly 54. The steering handle assembly 54 can carry appropriate controls and can be suitably coupled to a pair of front skis 56. As the steering handle assembly 54 is turned, the skis 56 pivot clockwise and counterclockwise about an attachment location. As the skis 56 pivot, the direction of the snowmobile 20 can be altered. The skis 56 are mounted to the frame assembly 22 though a front suspension assembly 58. Any suitable front suspension assembly 58 can be used.

Figure 5:
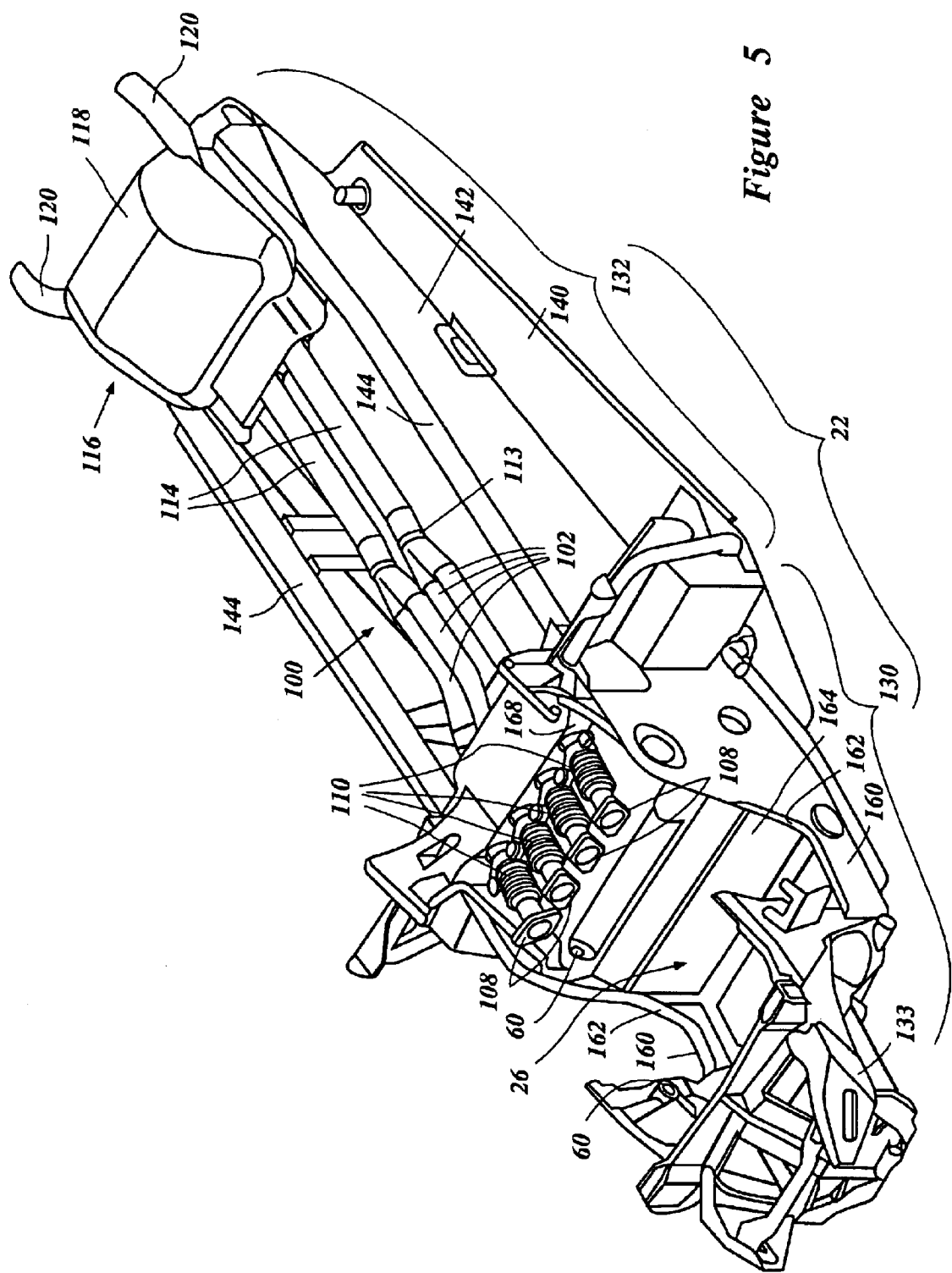
FIG. 5 is a perspective view of a frame assembly and certain components of the exhaust system of the snowmobile of FIG. 1.

With reference now to FIG. 4, the engine 28 is mounted to the frame assembly 22 in any suitable manner. As illustrated in FIG. 5, a set of resilient engine mounts 60 can be used to secure the engine to the frame assembly 22. The engine mounts 60 can be formed of rubber or a similar substance. By mounting the engine 28 with the resilient engine mounts 60, vibrations caused by operation of the engine 28 are substantially isolated from, i.e., not transmitted to, the frame assembly 22 and therefore, the operator.

The engine 28 in the illustrated arrangement is an inclined L-4 four-cycle engine that is mounted transversely within the engine compartment 26. In other words, the illustrated engine 28 comprises four cylinders that extend side-by-side across a width of the snowmobile 20. The cylinders each comprise a center axis O that is inclined relative to vertical. In some arrangements, engines having differing numbers of cylinders, different cylinder configurations (e.g., V, opposing, etc.), different orientations (e.g., vertical) and different operating principles (e.g., two-stroke, rotary, etc.) can be used.

The engine 28 is connected to a drive shaft 62 through a transmission. Any suitable transmission can be used, e.g., a continuously variable transmission or other transmission. The drive shaft 62 powers a drive unit 64. The drive unit 64 generally comprises a plurality of drive wheels 68. In one embodiment, the drive unit 64 comprises four drive wheels 68. The drive wheels 68 provide a motive force to a drive belt 70, which is commonly used in the snowmobile industry.

With reference again to FIG. 4, the drive belt 70 is guided around a preferred path on a pair of slide rails 72, a plurality of suspension wheels 74 and main rear suspension wheels 76. The slide rails 72 preferably support the suspension wheels 74 and the main rear suspension wheels 76. An idler roller 78 preferably is mounted to the frame assembly 22 and helps to define the preferred path for the drive belt 70. As is known in the snowmobile industry, these components can be mounted to the frame assembly 22 with a rear suspension system 80. Certain portions of the rear suspension system 80 have been schematically illustrated in the illustrated arrangement. Any suitable rear suspension system 80 can be used.

With reference again to FIG. 4, air moves in and out of the engine compartment 26 through the ventilation openings 90, 92 formed in the body cover 24. At least some of the air drawn or forced into the engine compartment 26 through the ventilation openings 92 is drawn into an exhaust system cooling passage, described in more detail below. Air exchanged within the engine compartment 26 circulates about the engine 28 and related drive components to help cool the engine 28 and the related drive components. The air is also drawn into the engine 28, is mixed with fuel to create an air-fuel charge, which is combusted within the engine 28 in a suitable manner. Combustion byproducts then are exhausted through an exhaust system 100. In the illustrated arrangement, the exhaust system 100 extends directly rearward from the engine 28. In this manner, an exhaust runner 102 that extends rearward from the engine 28 can be tuned to the engine 28 for improved engine performance. Additionally, the length of each runner 102 can be lengthened prior to merging together with any other runners such that pulse effects on adjoining cylinders can be reduced.

With reference now to FIG. 4, the exhaust system 100 will be described in greater detail. The exhaust system 100, as described above, preferably comprises the exhaust runners 102 that correspond to each cylinder and that extend generally rearward from the engine 28. Each exhaust runner 102 is coupled to an exhaust discharge pipe 106 that is individually joined to the engine 28 in any suitable manner, e.g., with a flange. In some arrangements, a single manifold can be used.

In the illustrated arrangement, each of the discharge pipes 106 are coupled to the corresponding runner 102 with a flexible bellows member 110. Preferably, this coupling is disposed within the engine compartment 26. The flexible bellows member 110 easily accommodates slight misalignments between the discharge pipes 106 and the runners 102. In addition, the runners 102 are secured in position relative to the frame assembly 22 with a mounting bracket (not shown) in one embodiment. Such a mounting arrangement allows the flexible members 110 to isolate a large portion of the engine vibrations away from the exhaust runners 102. In other words, if the portion of the exhaust system 100 upstream of the flexible bellows members 110 were directly connected with the frame assembly 22 then vibrations from the engine 28 would likely be transmitted directly from the engine 28 to the frame assembly 22.

With continued reference to FIGS. 4 and 5, at least two of the runners 102 join at a merge location 113 and the merged flow passes through a manifold pipe 114. In the illustrated arrangement, two of the runners 102 join at the merge location 113 and flow into one manifold pipe 114. Thus, the illustrated arrangement features two manifold pipes 114. In some arrangements, more than two runners 102 can join into a single manifold pipe and one or more than two manifold pipes 114 can be used.

The manifold pipes 114 extend rearwardly to a downstream end 115, which is located in a silencer box 116. In the illustrated arrangement, the silencer box 116 is disposed below a portion of the seat 34, as discussed more fully below in connection with FIGS. 11 and 12. The silencer box 116 includes an inner enclosure 117, an outer enclosure 118, and an insulating material 119. Preferably, the outer enclosure 118 at least partially surrounds the inner enclosure 117. In one embodiment, the outer enclosure 118 completely surrounds the inner enclosure 117. The insulating material 119 is positioned between the outer enclosure 118 and the inner enclosure 117. The inner enclosure 117 of the silencer box 116 defines an enlarged volume into which the exhaust can flow. Exhaust energy is dissipated within the silencer box 116 and the noise level of the exhaust can be decreased. In some embodiments, the insulating material 119 absorbs sound that is conducted by the exhaust system 100 from the engine to the silencer box 116. The insulating material 119 preferably also absorbs heat conducted by the exhaust system 100 so that components adjacent the silencer box 116 are not subject to excessive temperatures. Preferably, at least a portion of the outer enclosure 118 of the silencer box 116 is formed of a heat shield material to further reduce the transfer of heat out of the silencer box 116 in at least one direction, e.g., upward toward the seat 34. Thus, the ornamental portion 36 of the seat 34 above the silencer box 116 is not subject to transfer of a large amount of heat from the silencer box 116.

A pair of exhaust pipes 120 extends rearward from the silencer box 116. In some arrangements, a single exhaust pipe 120 extends from the silencer box 116. Other numbers of exhaust pipes 120 also can be used. One end of the exhaust pipes 120 preferably defines an ultimate exhaust discharge 122 from the snowmobile 20 such that the exhaust gases are discharged into the atmosphere. As illustrated in FIG. 4, the exhaust pipes 120 extend upwardly and rearwardly from the silencer box 116 in one embodiment. Preferably, the exhaust pipes 120 terminate at a location forward of the grab bar 52. Preferably, the bottom plate 37 overhangs the exhaust pipes 120, i.e., the bottom plate 37 extends farther rearwardly than the exhaust pipes 120 (see FIG. 11).

Figure 6:
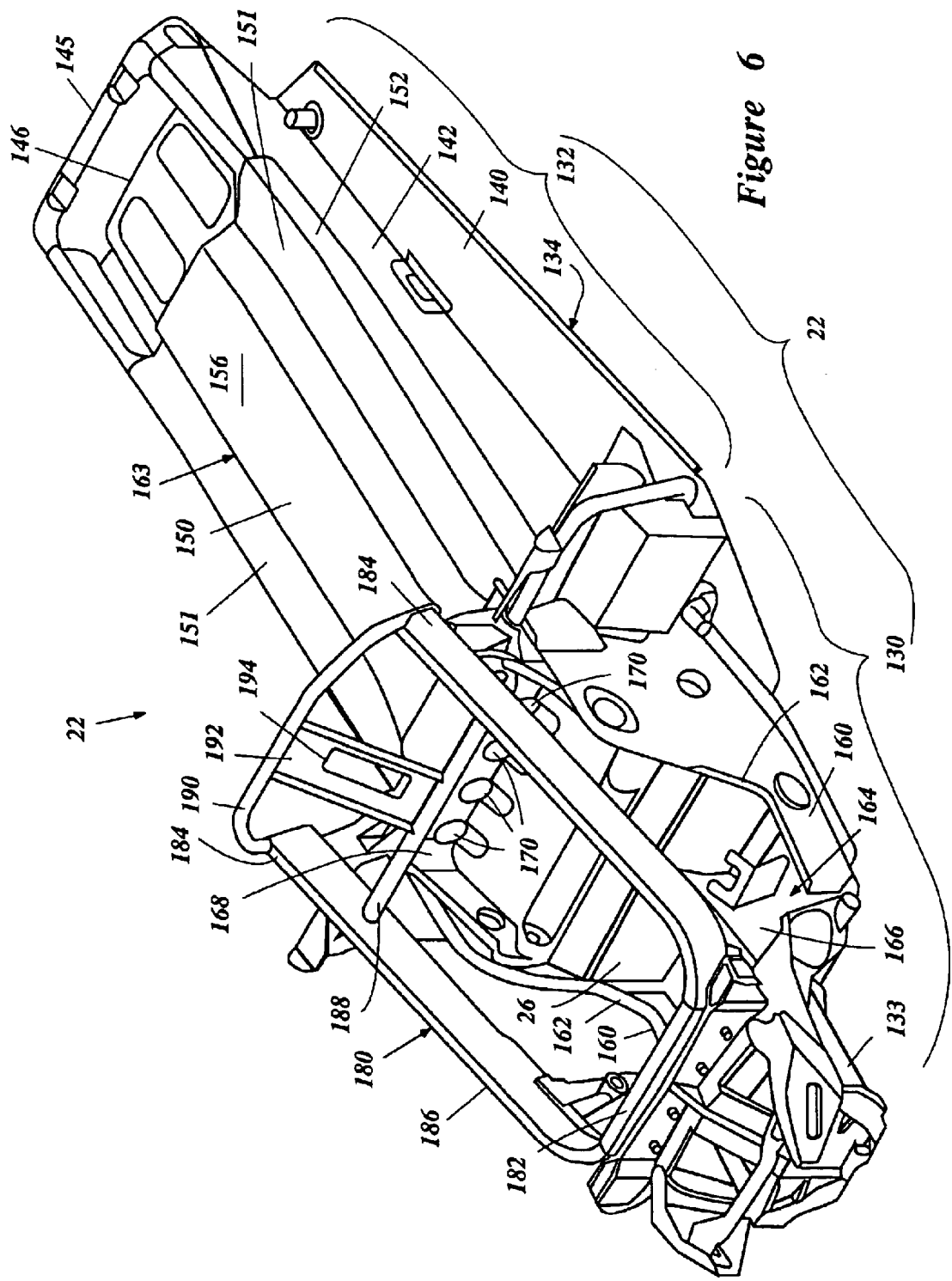
FIG. 6 is a perspective view similar to that of FIG. 5 with the components of the exhaust system removed.
Figure 7:
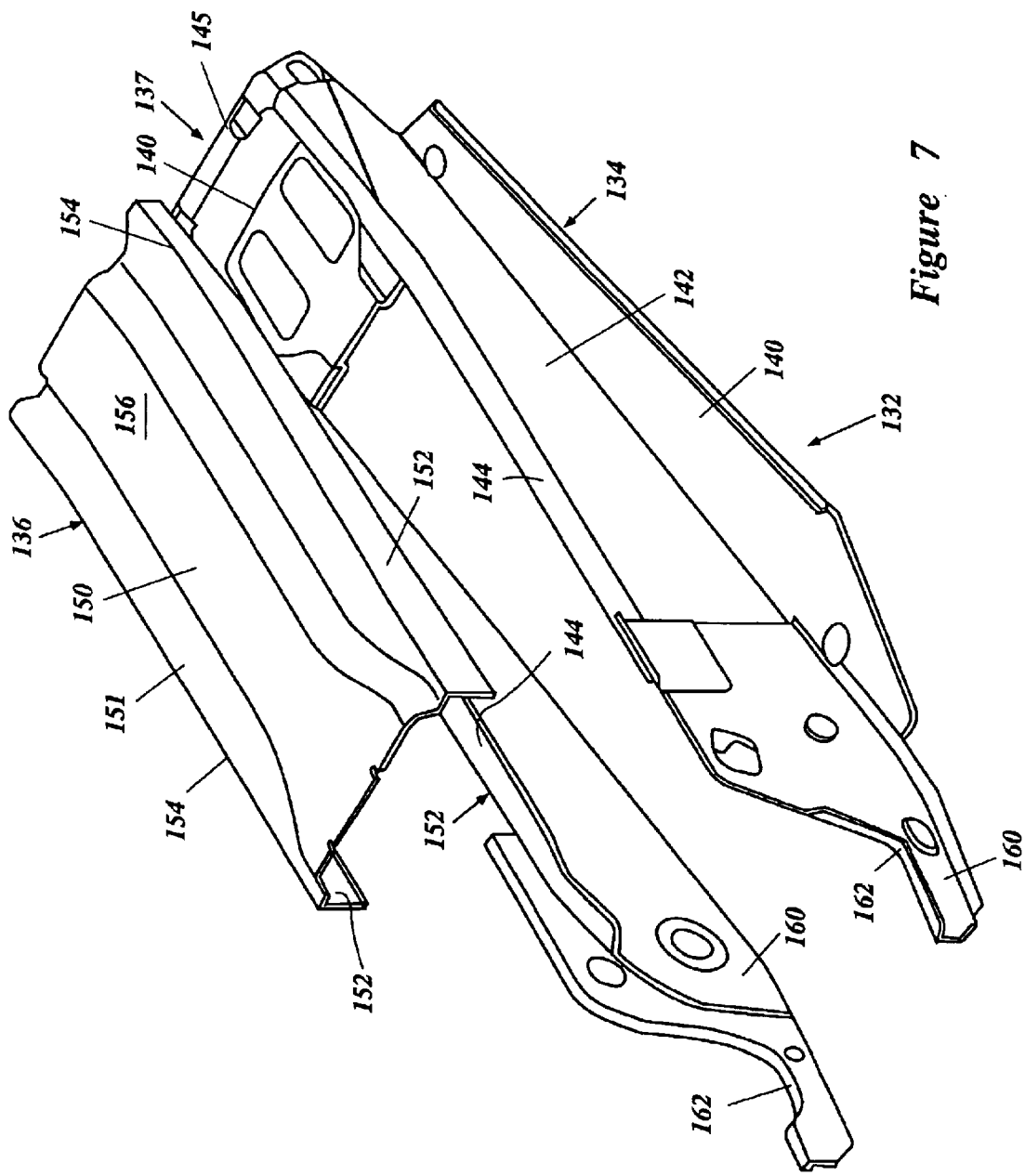
FIG. 7 is a perspective view of a portion of a frame assembly of the snowmobile of FIG. 1.

With reference now to FIGS. 5–7, the frame assembly 22 of the illustrated snowmobile 20 will be described in greater detail. The frame assembly 22 generally comprises a forward portion 130 and a rearward portion 132. The forward portion 130 includes a front portion 133. With reference now to FIG. 7, the rearward portion 132 in the illustrated arrangement generally is formed by two main components: a main body 134 and a center portion, or deck 136. In one arrangement, the rearward portion 132 resembles a hat shape in cross section.

The main body 134 generally comprises an inverted generally U-shaped center portion 137 and a pair of outwardly extending foot steps 140. The foot steps 140 extend along a majority of the length of the snowmobile 20 and are sized and configured to support the feet of an operator and any passengers. As is known, the operator and the passengers sit in a straddle fashion on the seat 34 such that the feet are positioned to either side of the seat 34.

The center portion 137 comprises a pair of upstanding side portions 142 that extend upward from the foot steps 140. The upstanding side portions 142 extend upward to a pair of inwardly extending top surfaces 144. In some arrangements, the top surfaces 144 can extend outward from the side portions 142; however, by extending the top surfaces 144 inward from the side portions 142, the strength of the frame assembly 122 can be increased. At least one bracket 145 extends between the rear end of side portions 142 to connect the side portions 142.

Along a rear portion of the main body 134, a bridge plate 146 extends between the top surfaces 144. The silencer box 116 can be mounted to or proximate the bridge plate 146. Additionally, protective members 148 can be mounted to a lower surface of the bridge plate 146. The protective members 148 form a contact location when the drive belt 70 is overly displaced upwardly toward the frame assembly 22. Thus, the belt 70 can slide along the protective members 148 without substantially impacting the frame assembly 22.

The deck 136 comprises a central horizontal portion 150, a pair of side portions 151 that are generally horizontal and are located on either side of the central horizontal portion 150, and a pair of vertical portions 152 such that the deck 136 is generally U-shaped in configuration. With this configuration, the deck 136 can overlie an upper portion of the main body 134. Preferably, the deck 136 and the main body 134 have overlapping corner portions that reinforce the frame construction. In one arrangement, the deck 136 is secured to the upper portion of the main body 134 with fasteners such as clips, rivets, bolts, screws and the like. In some arrangements, the two components can be adhered or welded together.

Two edges 154 are defined by the intersection between the vertical portions 152 and the horizontal portions 151. The horizontal portion 150 further comprises an upwardly extending deck protrusion 156 that accommodates a portion of the exhaust system 100. Moreover, the bottom plate 37 of the seat 34 extends over the deck protrusion 156. In one embodiment, the seat bottom plate protrusion 39 accommodates the deck protrusion 156. This construction makes advantageous use of the thicker material used in the central region of the seat 34. At the rearward portion 132 of the frame assembly 22, the exhaust system 100 advantageously extends between the bridge plate 146 and the deck 136.

At least a portion of the exhaust system 100 advantageously extends rearward generally below the deck 136 and above the track 70. In this manner, the movement of the track 70 can sweep cool air over the exhaust system 100 and any snow flying off of the track also can impinge upon the exhaust system 100. Thus, the Illustrated arrangement helps to cool the exhaust gases. In the illustrated arrangement, the merge location 113 of the pipes 102 is within this region defined between the deck 136 and the track 70. In particular, the merge location 113 preferably is at least partially received by the deck protrusion 156 in one arrangement. Thus, a plurality of pipes 102 extend within the region defined between the deck 136 and the track 70.

With reference again to FIG. 7, a front side panel 160 is secured to each of the vertical portions 142 of the main body 134. The panel 160 can be secured in any suitable manner, such as, for example but without limitation, welding, fasteners, adhesives, etc. Each of the side panels 160 comprises a notch 162. The notch 162 accommodates portions of the engine 28 and the related drive unit 64. In some arrangements, the panels 160 can be integrally formed with the main body 134; however, the illustrated arrangement advantageously increases the strength of the frame assembly 22 proximate the engine 28 due to the increased thickness of material.

With reference now to FIGS. 4–6, an intermediate member 164 extends between the two panels 160 and between the two vertical portions 142 of the main body 134. The intermediate member 164 can be attached in any suitable manner. Generally speaking, an upwardly-facing surface 166 of the intermediate member 164 defines a floor 167 for the engine compartment 26. A generally forwardly-facing surface 168 extends upward and rearward to define a rear wall 169 of the engine compartment 26. A plurality of openings 170 preferably are formed through the rear wall 169 of the intermediate member 164 to allow the exhaust system 100 to extend through the intermediate member 164 and out of the engine compartment 26.

To further increase the rigidity of the frame assembly 22, a frame subassembly 180 is secured to the frame assembly 22. This subassembly 180 desirably is generally rectangular in shape and advantageously is disposed generally above the engine 28. More preferably, the subassembly 180 is tied to the balance of the frame assembly 22 proximate a front end 182 of the subassembly and a rear end 184 of the subassembly. Even more preferably, the subassembly 180 is attached to the forward portion 130 of the frame assembly 22.

Thus, the engine 28 is positioned within a cavity, i.e., the engine compartment 26, defined between the side panels 160, above the floor 167, forward of a rear wall 168 and below the subassembly 180. Such a construction greatly increases the strength of the forward portion 130 of the frame assembly 22 while the open construction advantageously reduces the amount of material involved and, therefore, decreases the weight. Moreover, through the use of the subassembly 180, the amount of material used in the side panels 160 can be reduced, which lowers the center of gravity, without substantially affecting the integrity of the frame assembly 22.

With reference now to FIG. 6, the illustrated subassembly 180 generally comprises a generally rectangular tubular member 186 that is bent into a U-shape. A bight of the U-shape is disposed forwardly in the illustrated arrangement. A bar 188 extends between the two legs of the U-shaped tubular member 186 at the end opposite the bight. The bar 188 reinforces the open end of the U-shape defined by the tubular member 186. A second bar 190 extends upward and between rear ends 184 of the tubular member 186 to further reinforce the subassembly 180 and to support the body cover 24. Furthermore, a support plate 192 extends upward and rearward from the bar 188 to the second bar 190. The support plate 192 comprises a slotted opening 194 and the plate and the opening are positioned within a region in which a steering shaft portion of the steering mechanism extends. In the illustrated arrangement, the bar 188 is disposed forward of at least a portion of the engine while the other bar 190 is disposed rearward of at least a portion of the engine. In fact, the bar 190 advantageously is disposed rearward of the entire engine in one arrangement to further enhance the structural integrity of the construction.

Desirably, the subassembly 180 is removably attached to the forward portion 130 of the frame assembly 22 to enable the subassembly 180 to be removed for access to the engine 28 during maintenance. In some arrangements, the subassembly is mounted in a manner that allows access to the mounting fasteners with the body cover 24 attached to the snowmobile and the subassembly is secured to the body cover 24 such that the subassembly and the body cover can be removed together once the subassembly is separated from the balance of the frame assembly. More details of the attachment of the subassembly 180 may be found in U.S. application Ser. No. 10/014,162, filed Dec. 10, 2001, which is incorporated by reference herein in its entirety.

Figure 11:
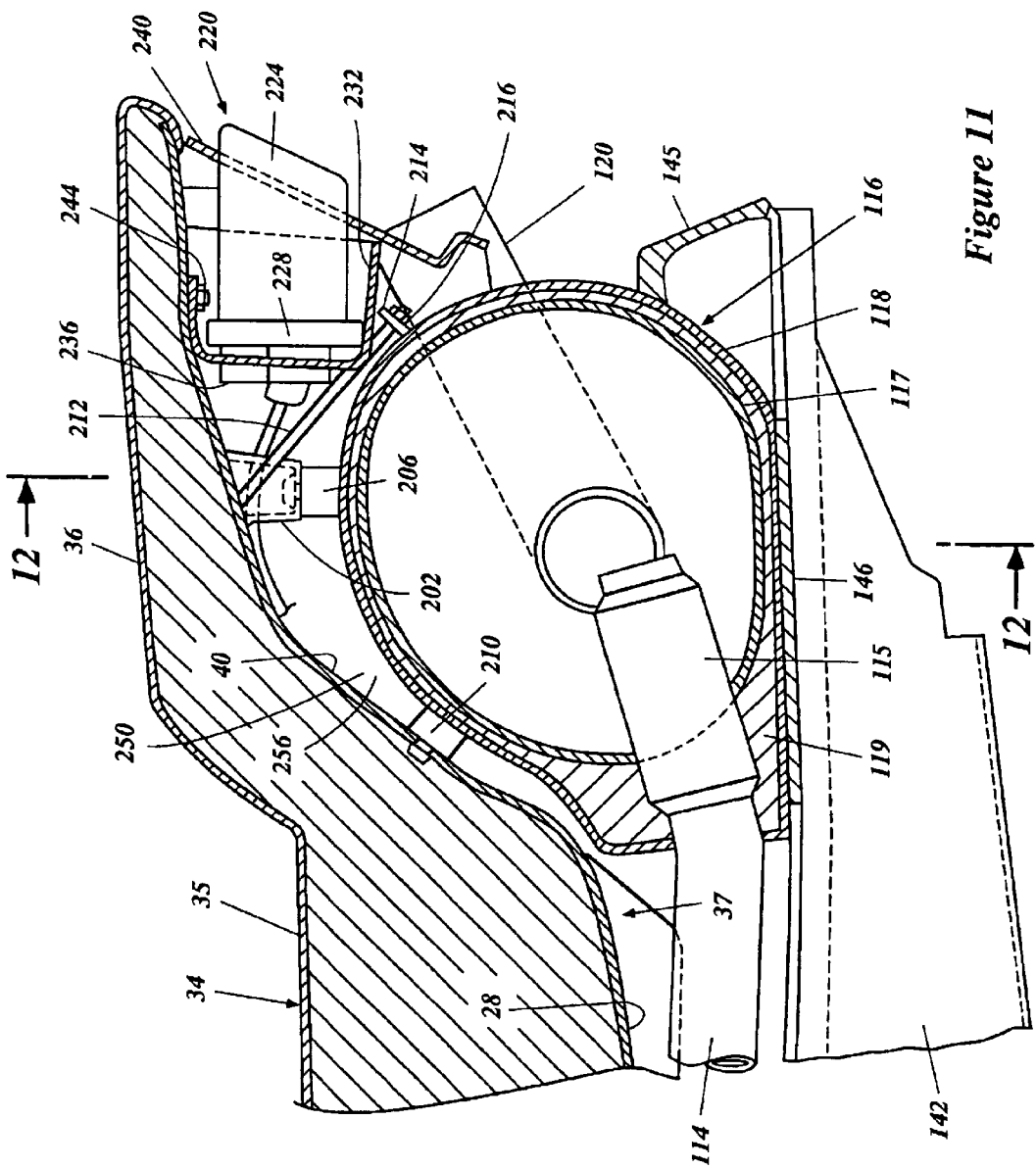
FIG. 11 is a view of a rear portion of the snowmobile taken along the line 11—11 in FIG. 12.
Figure 12:
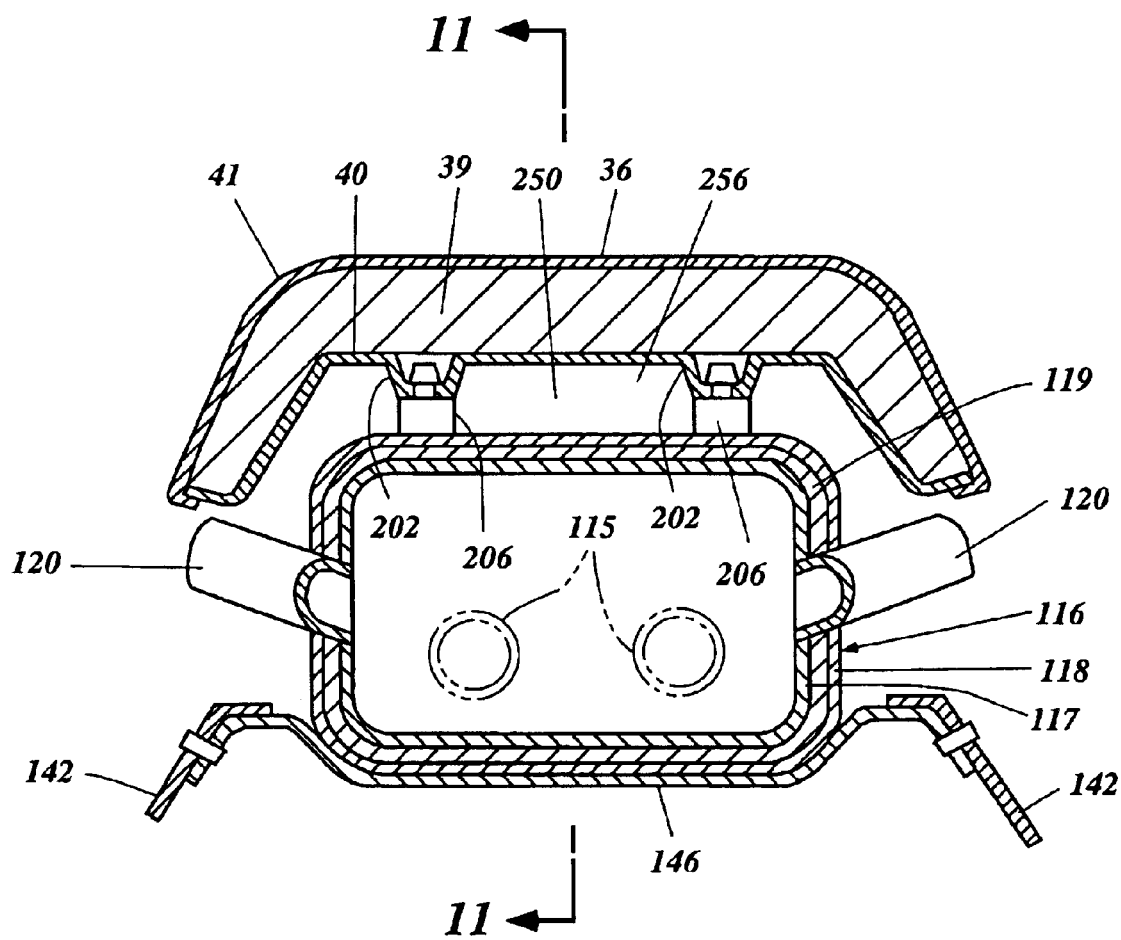
FIG. 12 is a section view of a portion of the snowmobile taken along the line 12—12 in FIG. 11.
Figure 12:
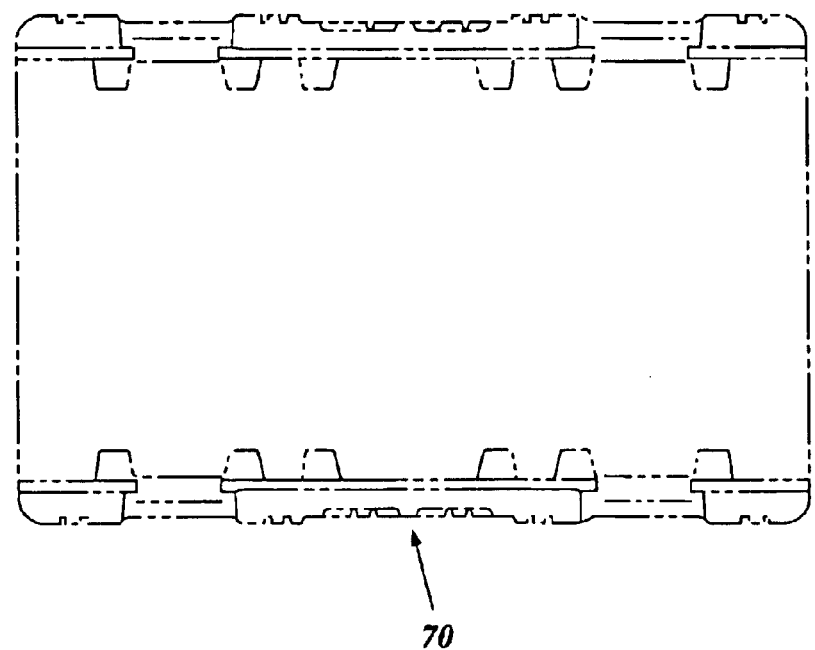

With reference to FIGS. 11 and 12, the interconnection of the seat 34 and the snowmobile 22 will be discussed in greater detail. As discussed above, the bottom plate 37 generally supports the seat 34. The bottom plate 37 also includes the rearwardly inclined portion 40. The rearwardly inclined portion 40 is advantageously formed to accommodate at least the silencer box 116. In one embodiment, the rearwardly inclined portion 40 of the bottom plate 37 includes at least one boss member 202 that extends downwardly, i.e., in the direction of the silencer box 116 when the bottom plate 37 is coupled with the frame assembly 22. It will be recognized that the boss member(s) 202 can be integrally formed with the rearwardly inclined portion 40 or attached thereto in any suitable manner. In the illustrated embodiment, two boss members 202 are provided (see FIG. 12). Preferably, a resilient seat mount 206 is interposed between the silencer box 116 and each boss member 202. In the illustrated embodiment, the resilient member 206 is connected to the outer enclosure 118 of the silencer box 116. Preferably at least a direct connect resilient seat mount 210 interconnects the bottom plate 37 of the seat 34 and the outer enclosure 118 directly. In the illustrated embodiment, the direct connect resilient member 210 interconnects the outer enclosure 118 and a forward portion of the rearwardly inclined portion 40 of the bottom plate 37. The seat mount(s) 206, 210 preferably are formed of rubber or a similar substance and isolate the seat 34 and the rider thereon from vibrations in the frame assembly 22. The seat mount(s) 206, 210 are preferably also made of a insulating material to reduce heat transfer between the silencer box 116 and the seat 34.

In the illustrated embodiment, two lock bolts 212 are secured to a lower surface of the rearwardly inclined portion 40 of the bottom plate 37 in the vicinity of the boss member(s) 202. The lock bolts 212 are inserted through securing holes in a bracket 214 secured to the outer enclosure 118 of the silencer box 116 and are clamped to the bracket 214 with lock nuts 216, whereby the rear part of the bottom plate 37 is secured to the frame assembly 22.

A tail lamp assembly 220 is disposed between ornamental portion 36 of the seat 34 and the silencer box 118. The tail lamp assembly 220 comprises a lens 224 and a base member 228 that supports the lens 224. The base member 228 is supported by a tail lamp bracket 232 through a resilient member 236. The lens 224 protrudes rearwardly through an aperture formed in a tail lamp cover 240, which partially encloses the tail lamp assembly 220 and partially covers the silencer box 116 on the rear side of the snowmobile 20. Preferably a bolt 244 secures the tail lamp bracket 232 to a lower surface of the rearwardly inclined portion 40 of the bottom plate 37.

As discussed above, the snowmobile 20 advantageously provides the exhaust system 100 that conveys exhaust gases from the engine 28 to the rear portion of the snowmobile 20. Some components of the exhaust systems 100 communicate with sources of heat, e.g., the engine 28, and the combustion byproducts generated by the engine 28. This heat can cause a significant temperature rise of the various components of the exhaust system 100, which can then induce a corresponding temperature rise in other components nearby the exhaust system, e.g., the frame assembly 22, the seat 34, and the tail light assembly 220.

To reduce the tendency of the components of the exhaust system 100 and other components nearby the exhaust system 100 to increase in temperature greatly, an exhaust system cooling passage 250 is preferably provided between the engine compartment 26 and the rear end of the snowmobile 20. In one embodiment, the exhaust system cooling passage 250 extends between the ventilation openings 92 and the rear end of the snowmobile 20.

Figure 8:
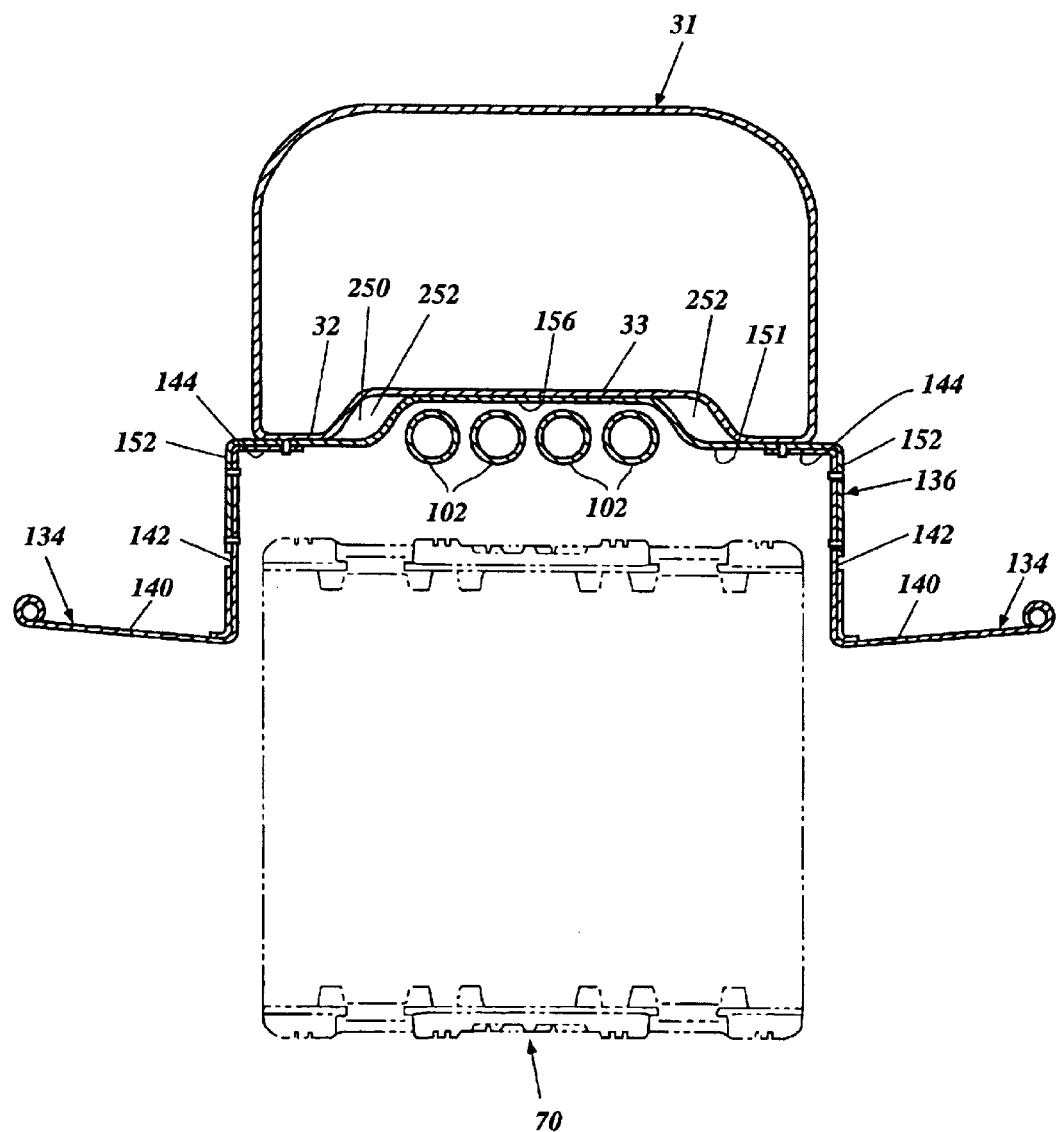
FIG. 8 is a section view of a portion of the snowmobile taken along the line 8—8 in FIG. 4.
Figure 9:
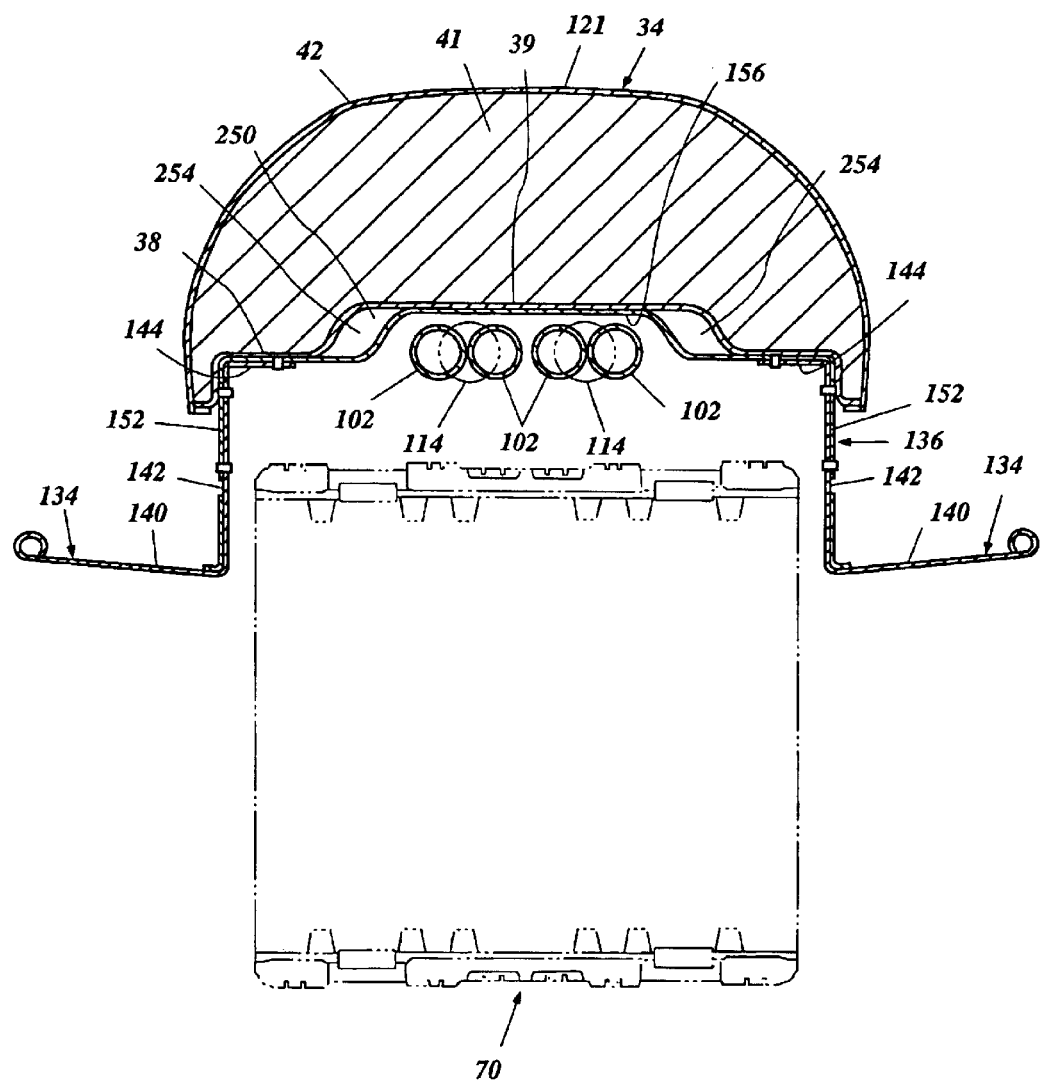
FIG. 9 is another section view of a portion of the snowmobile taken along the line 9—9 in FIG. 4.

In one embodiment, the exhaust system cooling passage 250 includes a first portion 252, a second portion 254, and a third portion 256. The first portion 252 of the cooling passage 250 is defined between the fuel tank protrusion 33 and a portion of the frame assembly 22. For example, as shown in FIG. 8, the first portion 252 is formed between the fuel tank protrusion 33 and the deck protrusion 156 in one embodiment. The second portion 254 of the cooling passage 250 is defined between the seat bottom plate protrusion 39 and a portion of the frame assembly 22. For example, as shown in FIG. 9, the second portion 254 is formed between the seat bottom plate protrusion 39 and the deck protrusion 156 in one embodiment. In one embodiment, the second portion 254 corresponds to the location of the merge location 113. The third portion 256 of the cooling passage 250 is defined between the silencer box 116 and the bottom plate 37 of the seat 34 in one embodiment. For example, as shown in FIGS. 11 and 12, the third portion 256 is formed between the silencer box 116 and the rearwardly inclined portion 40 in one embodiment.

In one arrangement, the cooling passage 250 comprises a pair of right and left tunnel-like passages. The passages are formed by engagement of an upwardly bulging and downwardly opening seat side recessed groove, i.e., the seat bottom plate protrusion 39, with an upwardly bulging and downwardly opening floor side recessed groove, i.e., the deck protrusion 156. In this arrangement, the deck plate protrusion 156 is not as wide as the seat bottom plate protrusion 39, thereby providing the cooling passage 250.

Cooling of the exhaust system 100 is accomplished by airflow that is illustrated by the arrows shown in FIG. 4. The airflow preferably is provided in a passage defined between the horizontal portions 151 and the upwardly extending deck protrusion 156. In one arrangement, the passage 250 is formed on each lateral side of the upwardly extending deck protrusion 156. As discussed above, a bottom side of the exhaust system 100 may be cooled by cool air and snow carried up into the vicinity of the exhaust system 100 by the track 70. The passage 250 is separated from the bottom side of the exhaust system 100 and from the area cooled by the track 70 by the deck 136. However, the deck protrusion 156 accommodates at least a portion of the exhaust system 100, e.g., the exhaust runners 102. The cooling passage 250 cools the deck 136 from the top side of the deck 136, particularly in the vicinity of the horizontal portions 151. Thus, the cooling passage 250 advantageously reduces the tendency of the exhaust system 100 to transfer excessive amounts of heat to the deck 136, to the frame assembly 22, and to the seat 34.

The arrows in FIG. 4 indicate that as the snowmobile 20 moves in a forward direction, air is directed into the exhaust system cooling passage 250. As discussed above, air is drawn or forced into the engine compartment 26. In one arrangement, fans can be used. This air can enter the engine compartment 26 through the ventilation openings 90 or through the ventilation openings 92. At least some of the air drawn or forced into the engine compartment 26 is drawn, forced, or otherwise flows into the exhaust system cooling passage 250. In one embodiment, the air in the engine compartment 26 that is drawn into the cooling passage first enters the first portion 252 of the exhaust cooling passage 250. As shown in FIG. 8, the air is conveyed rearwardly in a space between the fuel tank 31 and the deck 136. In one embodiment, the first portion 252 of the exhaust cooling passage 250 is provided on both sides of the central vertical longitudinal plane of the snowmobile 20. As shown in FIG. 9, the air is conveyed farther rearwardly from the first portion(s) 252 to the second portion 254, which is a space between the seat 34 and the deck 136. In one embodiment, the second portion 254 of the exhaust cooling passage 250 is provided on both sides of the central vertical longitudinal plane of the snowmobile 20. As shown in FIG. 10, the air is conveyed farther rearwardly from the second portion(s) 254 to the third portion 256, which is defined between the silencer box 116 and the seat 34. The third portion 256 provides a transverse cross-sectional area that is larger than that of the first portion 252 and the second portion 254. Accordingly, the resistance to airflow in the cooling passage 250 generally decreases in the rearward direction. This facilitates the flow of cooling air from the vicinity of the engine compartment toward the rear end of the snowmobile 20.

Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. A snowmobile comprising:
   a frame assembly comprising a forward portion and an inverted generally U-shaped portion;
   an engine mounted to the forward portion of the frame assembly;
   a drive belt powered by said engine and disposed at least partially within said inverted generally U-shaped portion;

an exhaust system connected to the engine and extending rearwardly of the engine in a region defined by a width of the drive belt, between the inverted generally U-shaped portion and the drive belt; and an exhaust system cooling passage defined between the forward portion of the frame assembly and the rear of the snowmobile, the exhaust system cooling passage being located adjacent at least a portion of the exhaust system.

2. A snowmobile comprising:

a frame assembly comprising a forward portion and an inverted generally U-shaped portion;

an engine mounted to the forward portion of the frame assembly;

a drive belt powered by said engine and disposed at least partially within said inverted generally U-shaped portion;

an exhaust system connected to the engine and extending rearwardly of the engine in a region defined by a width of the drive belt, between the inverted generally U-shaped portion and the drive belt, an exhaust system cooling passage defined between the forward portion of the frame assembly and the rear of the snowmobile, the exhaust system cooling passage being located adjacent at least a portion of the exhaust system; and a deck and a fuel tank coupled with the deck, wherein a first portion of the exhaust system cooling passage is defined between the fuel tank and the deck.

3. The snowmobile of claim 2, further comprising a seat coupled with the deck, wherein the exhaust system cooling passage further comprises a second portion defined between the seat and the deck.

4. The snowmobile of claim 3, further comprising a silencer box coupled with the U-shaped portion, wherein the exhaust system cooling passage further comprises a third portion defined between the seat and the silencer box.

5. The snowmobile of claim 4, wherein the transverse cross-sectional area of the third portion of the exhaust system cooling passage is not smaller than the transverse cross-sectional area of the second portion of the exhaust system cooling passage.

6. The snowmobile of claim 4, wherein the transverse cross-sectional area of the exhaust system cooling passage is larger at the rear of the snowmobile than the transverse cross-sectional area of the exhaust system cooling passage proximate the engine.

7. The snowmobile of claim 2, wherein the fuel tank comprises a fuel tank protrusion, and the first portion of the exhaust system cooling passage is at least partially defined by the fuel tank protrusion.

8. The snowmobile of claim 7, wherein the deck comprises a deck protrusion, and the first portion of the exhaust system cooling passage is defined by the fuel tank protrusion and the deck protrusion.

9. The snowmobile of claim 3, wherein the seat comprises a seat protrusion, and the second portion of the exhaust system cooling passage is at least partially defined by the seat protrusion.

10. The snowmobile of claim 9, wherein the deck comprises a deck protrusion, and the second portion of the exhaust system cooling passage is defined by the seat protrusion and the deck protrusion.

11. The snowmobile of claim 4, wherein the seat comprises a rearwardly-inclined portion, and the third portion of the exhaust system cooling passage is defined between the rearwardly-inclined portion and the silencer box.

12. The snowmobile of claim 2, wherein the deck further comprises a deck protrusion, and the first portion is defined between the deck protrusion and a portion of the fuel tank.

13. The snowmobile of claim 2, wherein the deck further comprises a deck protrusion, and the second portion is defined between the deck protrusion and a portion of the seat.

14. A snowmobile comprising:

a frame assembly comprising a forward portion and an inverted generally U-shaped portion:

an engine mounted to the forward portion of the frame assembly;

a drive belt powered by said engine and disposed at least partially within said inverted generally U-shaped portion:

an exhaust system connected to the engine and extending rearwardly of the engine in a region defined by a width of the drive belt, between the inverted generally U-shaped portion and the drive belt, an exhaust system cooling passage defined between the forward portion of the frame assembly and the rear of the snowmobile, the exhaust system cooling passage being located adjacent at least a portion of the exhaust system; and a deck having a deck protrusion and a seat having a seat protrusion, the exhaust system cooling passage comprises a first cooling passage and a second cooling passage, the first cooling passage at least in part defined between the deck protrusion and the seat protrusion, the second cooling passage at least in part defined between the deck protrusion and the seat protrusion, wherein at least one of the first cooling passage and the second cooling passage is laterally offset from the central longitudinal plane of the snowmobile.

15. The snowmobile of claim 14, wherein the first cooling passage and the second cooling passage are laterally offset from the central longitudinal plane of the snowmobile by about the same amount.

16. A snowmobile comprising:

a frame assembly comprising a forward portion and an inverted generally U-shaped portion;

an engine mounted to the forward portion of the frame assembly;

a drive belt powered by said engine and disposed at least partially within said inverted generally U-shaped portion;

an exhaust system connected to the engine and extending rearwardly of the engine in a region defined by a width of the drive belt, between the inverted generally U-shaped portion and the drive belt, an exhaust system cooling passage defined between the forward portion of the frame assembly and the rear of the snowmobile, the exhaust system cooling passage being located adjacent at least a portion of the exhaust system; and a deck having a deck protrusion and a fuel tank having a fuel tank protrusion, the exhaust system cooling passage comprises a first cooling passage and a second cooling passage, the first cooling passage at least in part defined between the deck protrusion and the fuel tank protrusion, the second cooling passage at least in part defined between the deck protrusion and the fuel tank protrusion, wherein at least one of the first cooling passage and the second cooling passage is laterally offset from the central longitudinal plane of the snowmobile.

17. The snowmobile of claim 16, wherein the first cooling passage and the second cooling passage are laterally offset from the central longitudinal plane of the snowmobile by about the same amount.

18. A snowmobile comprising:
   a frame assembly comprising a forward portion and an inverted generally U-shaped portion;
   an engine mounted to the forward portion of the frame assembly;
   a drive belt powered by said engine and disposed at least partially within said inverted generally U-shaped portion;
   an exhaust system connected to the engine and extending rearwardly of the engine in a region defined by a width of the drive belt, between the inverted generally U-shaped portion and the drive belt,
   an exhaust system cooling passage defined between the forward portion of the frame assembly and the rear of the snowmobile, the exhaust system cooling passage being located adjacent at least a portion of the exhaust system; and
   a seat, a silencer box positioned generally below the seat, and a resilient seat mount, the resilient seat mount positioned between the silencer box and the seat, the resilient seat mount configured to reduce heat transfer between the silencer box and the seat.

19. A snowmobile comprising:
   a frame assembly comprising a forward portion and an inverted generally U-shaped portion;
   an engine mounted to the forward portion of the frame assembly;
   a seat coupled with the U-shaped portion of the frame assembly;
   an exhaust system connected to the engine and extending rearwardly of the engine in a region defined below the seat to a silencer box positioned generally below the seat; and
   a resilient seat mount positioned between the silencer box and the seat, the resilient seat mount configured to reduce heat transfer between the silencer box and the seat.

20. The snowmobile of claim 19, wherein the seat further comprises a bottom plate and a boss member, the bottom plate having a rearwardly inclined portion configured to accommodate at least a portion of the silencer box, the boss member depending from the rearwardly inclined portion of the bottom plate, and the resilient seat mount positioned between the boss member and the silencer box.

21. The snowmobile of claim 20, further comprising a direct connect resilient seat mount positioned between the silencer box and the rearwardly inclined portion, the direct connect resilient seat mount in direct contact with the rearwardly inclined portion of the bottom plate of the seat.

* * * * *

UNITED STATES PATENT AND TRADEMARK OFFICE
CERTIFICATE OF CORRECTION

PATENT NO. : 6,808,034 B2  
DATED : October 26, 2004  
INVENTOR(S) : Takuji Nakano et al.

Page 1 of 1

It is certified that error appears in the above-identified patent and that said Letters Patent is hereby corrected as shown below:

Column 12,  
Line 10, after "portion" delete ":" and insert -- : --.  
Lines 14-15, after "portion" delete ":" and insert -- ; --.

Signed and Sealed this

Seventh Day of February, 2006

JON W. DUDAS  
*Director of the United States Patent and Trademark Office*